United States Patent

[11] 3,620,883

| [72] | Inventor | George S. Nalle, Jr.<br>108 West Second St., Austin, Tex. 78701 |
|---|---|---|
| [21] | Appl. No. | 762,519 |
| [22] | Filed | Sept. 25, 1968 |
| [45] | Patented | Nov. 16, 1971 |

[54] APPARATUS FOR EXTRUDING PLASTIC NETTING
8 Claims, 19 Drawing Figs.

[52] U.S. Cl. .................................................. 156/500, 156/167
[51] Int. Cl. .................................................. B29c 17/00
[50] Field of Search .......................................... 156/167, 441, 500, 433; 161/109, 68, 140; 264/167, 171; 18/12, 13

[56] References Cited
UNITED STATES PATENTS

| 1,025,048 | 4/1912 | Bratt | 144/41 |
| 2,682,292 | 6/1954 | Nagin | 156/500 |
| 2,919,467 | 1/1960 | Mercer | 156/167 |
| 3,051,989 | 9/1962 | Mercer | 156/500 |
| 3,067,084 | 12/1962 | Nalle, Jr. | 156/167 |
| 3,089,804 | 5/1963 | Gutierrez | 156/500 |
| 3,118,180 | 1/1964 | Nalle, Jr. | 264/171 |
| 3,123,512 | 3/1964 | Mercer | 156/500 |
| 3,270,370 | 9/1966 | Mercer | 18/12 |
| 3,281,897 | 11/1966 | Mercer | 18/12 |
| 3,390,039 | 6/1968 | Caughman et al. | 156/296 |

*Primary Examiner*—Benjamin A. Borchelt
*Assistant Examiner*—G. E. Montone
*Attorneys*—Arnold, Roylance, Kruger & Durkee, Frank S. Vaden, III and John F. Lynch

ABSTRACT: This application discloses extrusion die head assemblies and mthods for extruding plastic to produce solid or filamentary ribbonlike products with net or openwork overlay. A center die has an extrusion opening or openings defining a straight line or other open figure, while a circular rotating die surrounds the center die to produce a netlike pattern which is partially fused with the portion extruded from the center.

PATENTED NOV 16 1971 3,620,883

G. S. Nalle, Jr.
INVENTOR

BY Arnold, Roylance,
Kruger & Durkee
ATTORNEYS

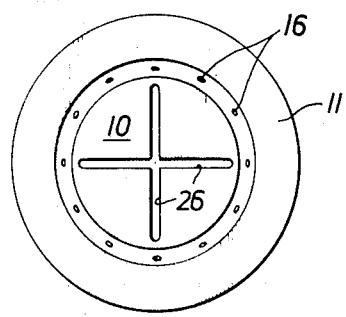
FIG. 8
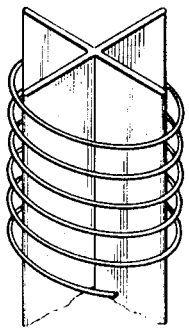
FIG. 9
FIG. 10
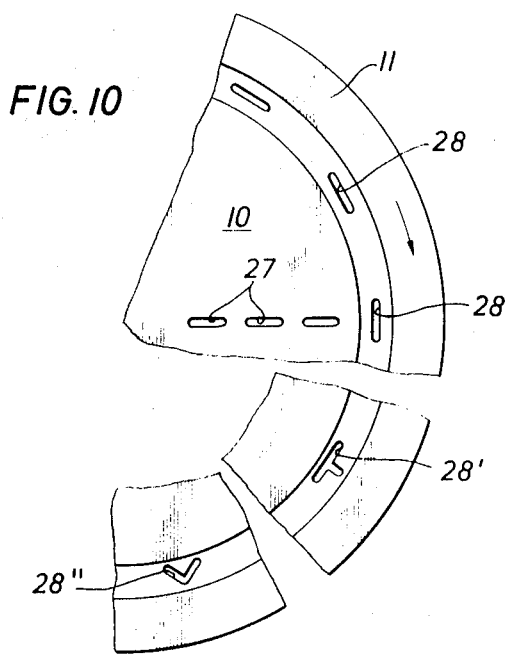
FIG. 11
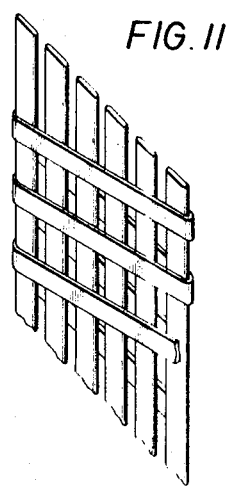
FIG. 12
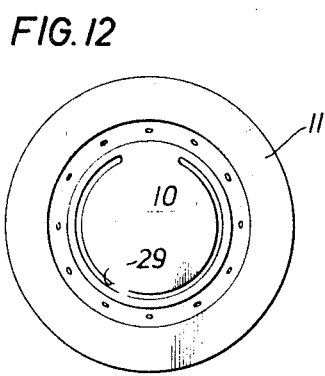
FIG. 13
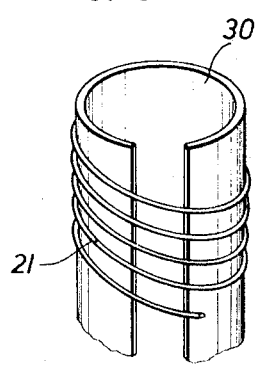

G. S. Nalle, Jr.
INVENTOR

BY Arnold, Roylance,
Kruger & Durkee
ATTORNEYS

APPARATUS FOR EXTRUDING PLASTIC NETTING

Openwork or netlike products of thermoplastic material may be formed by simultaneously extruding a number of separate streams or filaments of the thermoplastic and guiding the filaments while still softened and fusible to intermittently contact one another. Both tubular and flat plastic nets are formed by this technique in many different patterns. Many types of extrusion die assemblies and apparatus have been developed for producing varieties of patterns of plastic net, exemplary ones of these being disclosed in my U.S. Pats. Nos. 3,012,275, 3,019,147, 3,067,084, 3,118,180, and 3,127,298.

It is a primary feature of the present invention to provide techniques for producing extruded thermoplastics in a variety of composite structures, including solid shapes as well as openwork, which are either usable as the final product in the form extruded, or easily converted to usable form. Another feature is the provision of extrusion techniques and apparatus which permit direct production of plastic products such as chair webbing and like products requiring high tensile strength, and producing products which include solid and fairly rigid shapes along with openwork overlay.

In accordance with certain exemplary embodiments of the invention, an extrusion die head assembly is used which includes a central nonrotating die plate along with a circular die surrounding an rotating with respect to the central die. The outer rotating die includes a circular pattern of extrusion openings, while the central die has a pattern of openings or a single opening which may be characterized as defining an "open" figure, that is, a straight line or an X- or U-shape as distinguished from a circle. Hot plastic material is forced through the die head assembly under pressure, and is guided or drawn away, using suitable mandrels in some cases, so that the filaments extruded from the various openings will at least partially contact one another and fuse together. The filaments extruded by the outer circular die may be caused to contact the ribbon produced by the central die on both sides or only on one side, or only on the outer ends of the ribbon, depending upon the end utility of the product being extruded. The general concept of the invention not only permits a wide variety of end products as described herein which were not heretofore produced with facility, but also many other shapes and variations may be envisioned.

Novel features which are believed to be characteristic of the invention are set forth in the appended claims. The invention itself, however, as well as further features and advantages thereof, may best be understood by reference to the following detailed description of particular embodiments, when read in conjunction with the accompanying drawing, wherein;

FIG. 8 is a bottom view of an extrusion die head according to still another embodiment of the invention;

FIG. 9 is a pictorial view of a segment of a product produced by the die head of FIG. 8;

FIGS. 10 and 17 are enlarged detail bottom views of segments of an extrusion die head according to other embodiments;

FIG. 11 is a pictorial view of a segment of a product produced by the die head of FIG. 10;

Figure 14:
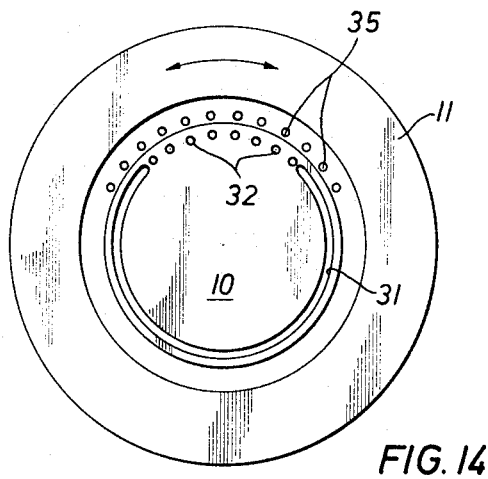
Figure 16:
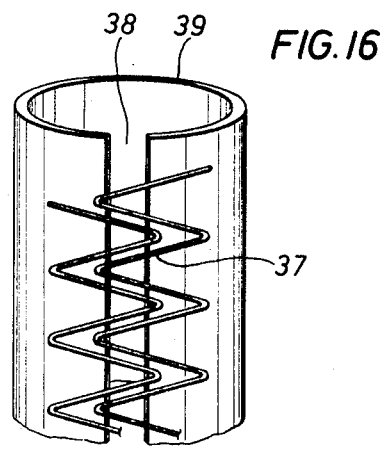
Figure 15:
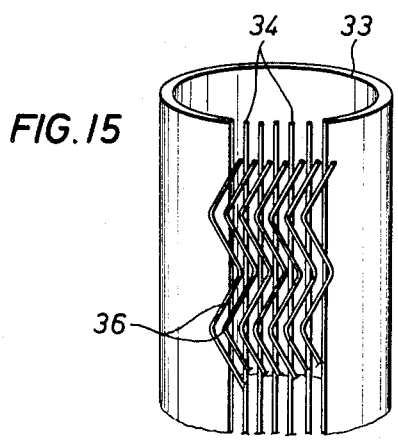
Figure 18:
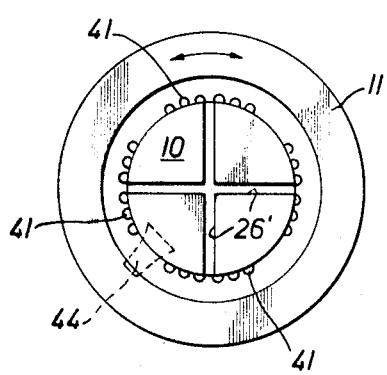
Figure 19:
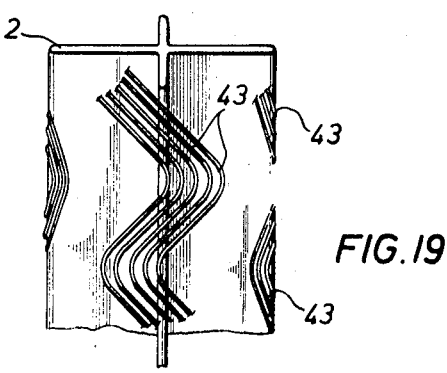

FIGS. 12, 14 and 18 are bottom views of extrusion die head assemblies according to still further embodiments of the invention; and FIGS. 13, 15 and 19 are pictorial views of segments of products produced by the die heads of FIGS. 12, 14 and 18, respectively, while FIG. 16 is a modification of the product of FIG. 13.

The drawings are considered a part of this specification and are incorporated herein. It is noted that like parts appearing in several Figures of the drawings will bear like reference numerals.

Figure 1:
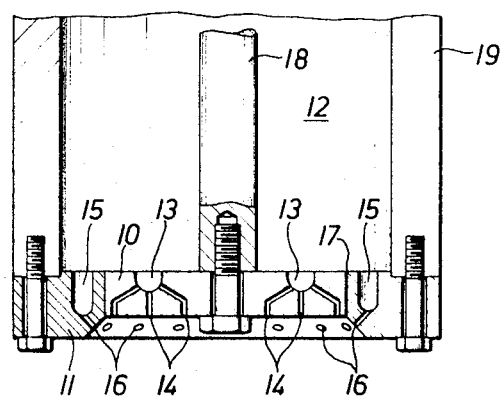
FIG. 1 is an elevation view in section of a portion of an extrusion die head according to one embodiment of the invention.

With reference now to FIG. 1 of the drawings, a portion of a die head assembly for extruding plastic is illustrated according to the invention. The die head includes an inner, nonrotating, die 10, and an outer rotating die 11. Above the die head, a chamber or cavity 12 is provided for receiving a continuous supply of molten plastic under pressure from an inlet port, not shown, in the upper portion of the chamber. Extrusion passages 13 in the stationary die 10 admit plastic to a row of a plurality of extrusion openings 14. A number of these openings 14 are arranged in straight line as may be best seen in FIG. 2. Similarly, a passage 15 in the rotary die admits molten plastic to a plurality of extrusion openings 16 which are arranged in a circle along the inner slanted face of the die. The openings 16 are slanted inward at an angle to aid in assuring contact of the pliable and fusible plastic as it exits from the extrusion openings so that portions of the net will be adhered to one another. The size of the die head may be such that the diameter of the circle of holes 16 is about 1 or 2 inches or more, for example, although smaller or larger sizes may be used, of course. The size of individual holes would depend upon the desired appearance of the product and other factors, but may be as small as 10 or 20 mils, although usually much larger.

The die 10 fits closely within a cylindrical opening 17 in the die 11 so that the outer or rotary die 11 may turn with respect to the stationary inner die, but yet molten plastic will not be extruded out through the interface to any appreciable extent. A seal may be provided rather than relying solely upon close fit.

Figure 2:
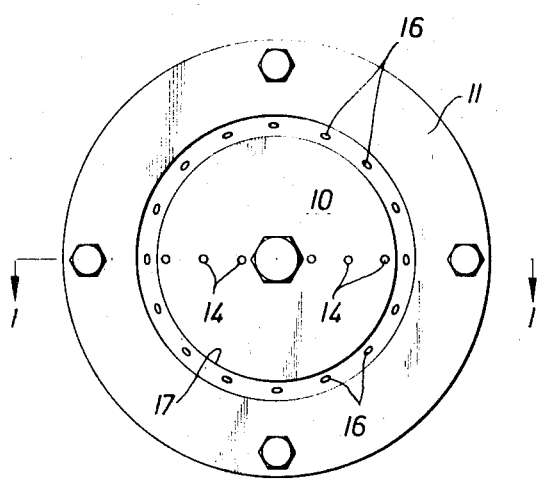
FIG. 2 is a bottom view of the extrusion die head of FIG. 1.

The structural parts of the complete extrusion system used with the die head assembly of FIGS. 1 and 2 would be conventional and need not be described or illustrated here. Ordinarily, pressurized plastic would be supplied to the chamber 12 from an extrusion worm or screw, and a heating system would maintain the thermoplastic material at the proper temperature for extrusion. A cooling bath using water, for example, would be positioned below the die head to solidify the extruded material. The stationary die 10 would be supported by means which may include a shaft 18 secured to a fixed part of the upper portion of the chamber, while the outer rotary die 11 may be secured to an outer cylindrical housing 19. The housing 19 would be rotated by conventional means such as a gear assembly, or belt and pulley arrangement.

In operation of the die head assembly of FIGS. 1 and 2 according to the invention, the stationary die 10 will extrude a ribbonlike or beltlike geometry made up of a plurality of individual filaments as defined by the holes 14 arranged in a straight line. Meanwhile, filaments extruded from the hole 16 in the circular rotary die 11 will encircle the ribbon in a net pattern, and will be bonded thereto.

Figure 3:
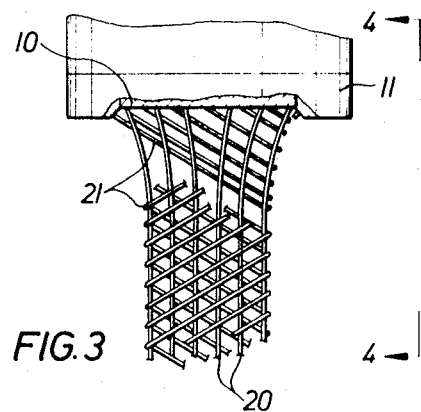
FIG. 3 is an elevation view of the extrusion die head of FIGS. 1 and 2, in schematic form, showing the apparatus in operation.

Referring to FIG. 3, operation of the die head of FIGS. 1 and 2 in the manner described is illustrated in a front view. The stationary die 10 produces a ribbon in the form of a plurality of filaments 20 which provide an essentially flat, straight band or belt when pulled away from the extrusion die head and cooled in conventional manner. Plastic extruded from the holes in the rotary die 11 will create a netlike shroud of filaments 21 encircling the straight band of filaments 20.

Figure 4:
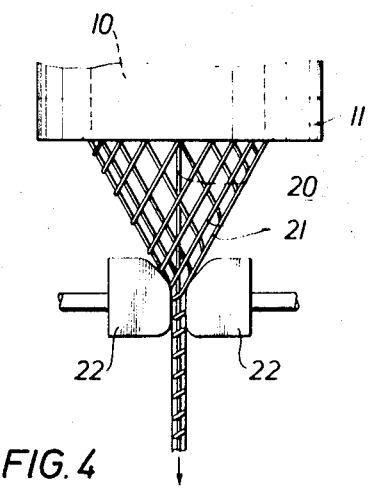
FIG. 4 is an elevation view of one embodiment of the apparatus of FIGS. 1–3, taken as a side view along the line 4–4 in FIG. 2.

Referring to FIG. 4, a side view of the extrusion die head in operation is illustrated for an embodiment utilizing a pair of shaping bars or mandrels 22. These bars may be preferred in some applications to assure that the filaments 21 are forced into contact with the center filaments 20 to provide adherence of the filaments one to another. The bars 22 are rounded, parallel surfaces which are externally supported by means not shown. The bars are fixed, i.e., do not rotate with the rotary die 11. In using the embodiment of FIG. 4 with the bars 22, the pull rate for the completed net ribbon is adjusted to provide a smooth lay of the outer spiral filaments onto the straight filaments 20. Without the bars 22, and using an appropriate pull rate, a similar flat net structure might be provided but with perhaps less uniformity.

Figure 5:
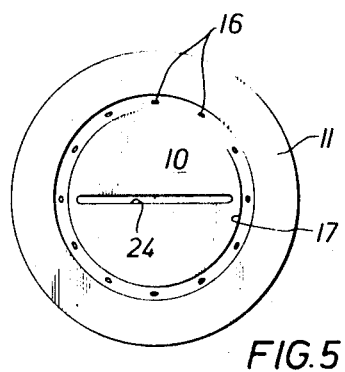
FIG. 5 is a bottom view of an extrusion die head assembly according to another embodiment of the invention employing a flat ribbonlike center section.
Figure 6:
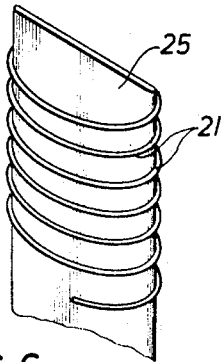
FIG. 6 is a pictorial view of a segment of a product produced by the die head of FIG. 5.

With reference now to FIG. 5, it is to be noted that the central stationary die 10 may utilize a narrow elongated slot 24 as the extrusion opening in place of a line of small openings 14 as in FIG. 2. The opening 24 would produce a flat integral ribbon, around which the extrusion openings 16 in the rotary die 11 produce a spiral net of filaments 21 as before. The resultant product is seen in FIG. 6 wherein the filaments 21 surround a flat ribbon 25, preferably the filaments 21 contacting only the edges of the ribbon 25 so that the courses of the spiral filament 21 stand away from the flat portions of the ribbon. The product of FIG. 6 would have its principal utility as chair webbing wherein the spiral filaments have the function of holding the clothing of the person seated in the chair up away from the plastic ribbon 25, facilitating air circulation. While the product made as in FIG. 3 may be used for this purpose, and indeed would provide even more circulation, the product of FIG. 6 may be preferred for additional tensile strength.

Figure 7:
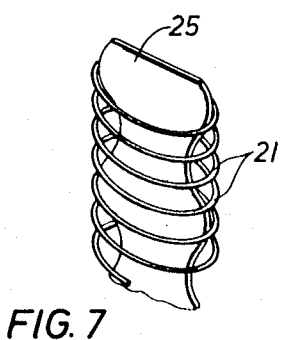
FIG. 7 is a pictorial view of a segment of a product produced by the extrusion die head of FIG. 5 according to a modified embodiment.

In FIG. 7, a product is shown similar to that of FIG. 6, made using the extrusion die head of FIG. 5, but wherein the center die 10 is oscillated through an angle of perhaps 30 degrees to produce a curled or wavy configuration of the ribbon 25. The pull rate, pressure of the molten plastic, etc., may be such that the spiral encasement provided by the filaments 21 is either generally straight-sided or cylindrical, or else a pattern which follows the contour of the scalloped or wavy ribbon 25. The configuration of FIG. 7 would have utility as decorative ribbon. Oscillation of the die 10 would be provided by conventional means such as a motive power mechanism including an eccentric or cam drive for the shaft 18 of FIG. 1.

In FIG. 8 another configuration of the central die 10 is illustrated wherein the extrusion opening is in the form of an X-shaped pair of intersecting slots 26. The die head configuration of FIG. 8 would produce a product as seen in FIG. 9. This structure may be used as a filter support core for use with a high pressure system wherein it is important to avoid collapse of the supporting core. Alternatively, for this purpose, the inner die may be oscillated, rotated or counterrotated with respect to the outer rotating die 11 to produce a structure having added crush resistance. Of course, this product may also be used or decorative purposes.

Referring to FIG. 10, some of the alternative shapes for the extrusion openings are illustrated in a bottom view of a segment of the die head as discussed above. In the central stationary die 10, the openings may be a series of elongated slots 27 rather than small circular openings as in FIG. 2, or rather than a single elongated slot extending all the way across the die as in FIG. 5. The embodiment of FIG. 10 provides some of the advantages of both configurations. The extrusion openings in the rotary outer die 11 may also be elongated slots 28 rather than circular openings. This will provide a variation in decorative effect, as may be seen in FIG. 11 which is a prospective view of a segment of the product produced by the die head of FIG. 10 with elongated slots 27 in the center die and slots 28 for the rotary die. Many combinations of various shapes for the extrusion openings in the stationary and rotary dies may be envisioned. For example, the T-shaped holes 28' or V-shaped holes 28'' in the die 11 may be used as seen in segments of FIG. 10, or the holes may be W-shaped, oval, etc. The extrusion openings in the center stationary die may be a row of small holes which are X-shaped, instead of one large X-shape as in FIG. 8, or a row of small holes of various other shapes as referred to above. Any combination of shapes for the rotary and stationary dies may be used, and various shapes may be used on one of the dies, i.e., alternate circular and elongated slot type shapes for the holes around the rotary die 11.

Separate sources of molten plastic may be provided for the die head as described above, one supplying the stationary die and the other supplying separately the rotary die. In this manner, plastic material of two different colors, or two different types of plastic material, may be used for the inner ribbon and outer filaments. Interesting, decorative or structural effects may be thus provided. A rotary die head for containing two separate sources of plastic of different colors is set forth in my U.S. Pat. No. 3,118,180, issued Jan. 21, 1964.

In FIG. 12, an embodiment of the invention is illustrated wherein the central stationary die 10 includes a horseshoe shaped circular slot 29 which would function to produce an almost cylindrical extruded tube 30 as seen in the pictorial view of FIG. 13. The spiral filaments 21 produced by the rotating outer die 11 would be generally of the same configuration as before. These filaments 21 would be merely adhered to the cylindrical trough 30 around most of its periphery, but would provide a netlike covering over the opening in the cylinder 30. This product would be made of appropriate size and thickness to be used as, e.g., drainfield pipe for septic tank systems, or a drainage gutter for roof wherein the filament net functions to keep out leaves and other debris.

A pair of concentric counterrotating circular dies 11 may be used with the embodiment of FIG. 12, or the other embodiments, to produce a cross hatched type of netting rather than netting made up merely of parallel strands. Apparatus as in my U.S. Pat. No. 3,067,084 may be used for this purpose.

The plastic materials utilized with the various embodiments of the invention may be any of the commercially available thermoplastics, such as polyethylene, vinyl polymers, styrene polymers, acrylic polymers (or copolymers of the foregoing), polypropylene, nylon, etc. An especially decorative type of ribbon is produced by incorporating a foaming agent in the plastic material prior to extruding. The foaming agent may comprise a material known as Selogen as sold by U.S. Rubber Company. Many other foaming agents are available which are suitable for this purpose. The foaming agent imparts to plastic a deep satinlike lustre which is particularly attractive when incorporated with pastel colors when the product is oriented.

Referring now to FIG. 14, an embodiment of the invention similar to that of FIG. 12 is illustrated. Here the inner die 10 is stationary and includes a U-shaped extrusion opening 31 similar to the opening 29 of FIG. 12. Further, the die 10 has a plurality of holes 32 in the gap in the U-shaped opening 31 so that the product extruded by this die 10 will be a sleeve or trough 33 as seen in FIG. 15, having a plurality of strands or filaments 34 in the gap. A movable circular die 11 surrounding the die 10 of FIG. 14 has a plurality of holes 35 adjacent the gap in the U-shaped opening 31. This die 11 is mechanically coupled by gears or a belt and pulley arrangement to a motor driven mechanism of conventional form which produces oscillatory motion so that the circular die 11 oscillates through an arc of perhaps 10 or 15 degrees, more or less, at a rate such that a netlike pattern is defined as might be seen in FIG. 15, the holes 35 producing filaments 36. The overlay of filaments 36 adheres to the filaments 34 and to the sleeve 33 at points of intersection, while the extruded plastic is still tacky or fusible. The structure of the die head assembly may be similar to that of FIG. 1, while the remaining parts of the extrusion apparatus such as the plastic supply, the heater, the motive power means, the drawing and cooling means, etc., being as set forth in my aforementioned patents.

In place of the oscillatory motion of the outer die 11 in the embodiment of FIG. 14, the motion may be circular as in FIG. 12, in which case the pattern of holes in the outer die would be a complete circle rather than only a segment of a circle. The overlay of filaments would in such case completely encircle the sleeve 33.

The product produced by embodiment of FIGS. 14 and 15 may be of various sizes and materials. To produce a drain gutter as mentioned above, the hole 31 would be of several inches in diameter, and the wall thickness or width of the hole 31, as well as that of the filaments, would be perhaps 100 mil, more or less, as would apply to FIGS. 12 and 13. However, another product of different utility produced by the embodiment of FIGS. 14 and 15 is that of a film bag with a net ventilator as may be used for consumer sales of fruits and vegetables. In this form, the diameter of the die 10 would be longer, but the wall thickness would be in the film range, e.g. a few mils, and the material would be film grade polyethylene, for example. Transparent or opaque plastic may be used, and the bag may provide a desirable surface for printing.

Instead of rotary motion in a full circle, the oscillatory overlay technique of FIGS. 14 and 15 may be used in the embodiment of FIGS. 12 and 13, where filaments in the gap are not present, provided the arc through which the outer die rotates exceeds the arc width of the gap in the U-shaped hole 29. An example of a product made in this manner is seen in FIG. 16, where oscillatory-type net 37 covers a gap 38 in a trough-shaped central part 39.

Figure 17:
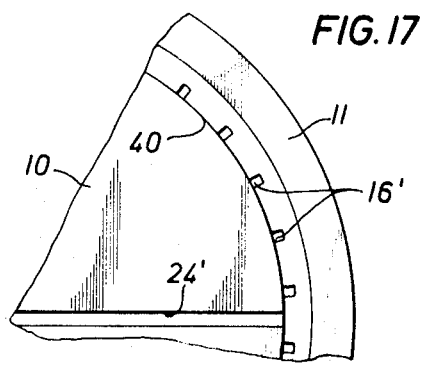

Rather than the extrusion openings in the various embodiments of a die head assembly as discussed, being spaced from the mitre line or the interface between the two circular dies, the openings may intercept the mitre line as seen in FIG. 17. Here the outer die 11 includes openings 16' similar to the holes 16 in FIG. 5, but intersecting the mitre line 40, which is the interface between the stationary center die 10 and rotating die 11. The slot 24' also intersects the mitre line, so when the holes 16' pass the ends of the slot 24' in the extrusion operation, the extruded plastic material is integrally joined, as discussed in my prior patents.

In the manufacture of a noncrushable filter product as discussed with reference to FIGS. 8 and 9, looped material may be formed by oscillating the outer die rather than rotating. Referring to FIG. 18, the outer die 11 contains a plurality of groups of extrusion openings 41 which oscillate in an arc adjacent the ends of an X-shaped opening 26' similar to the embodiment of FIG. 8. Here also the openings intersect the mitre line. The product produced by this embodiment is seen in FIG. 19, and will include a central X-shaped ribbon 42 and loop filaments 43 along each of the four edges of the ribbon. A product of this form may also be sold for decorative purposes, such as for Christmas tree decorations, or may be made of very small size and of a shape to resemble a spun-staple fiber. A stationary mandrel 44 as seen dotted in FIG. 18 may be positioned below the die head between each group 41 to prevent the groups of extruded filaments from touching one another while still fusible.

While the invention has been described with reference to particular embodiments, it is understood that this description is not meant to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

What is claimed is;

1. Apparatus for manufacturing an extruded plastic product having a netlike plastic overlay which comprises:
   a first die member having an extrusion opening defining a section of a cylinder which does not close upon itself to extrude a trough-shaped extrudate;
   a second die member having a plurality of filament extrusion orifices disposed exteriorly of said first extrusion opening;
   means to supply extrudable resinous plastic to said first die member and said second die member; and
   means for moving said second die member relative to said first die member to produce a filament overlay over said trough-shaped extrudate.

2. The apparatus of claim 1 wherein said first die member is disposed within a central circular aperture in said second die member.

3. The apparatus of claim 2 wherein said first die member is stationary and wherein said means for moving said second die member produces a rotary movement of said second die member.

4. The apparatus of claim 2 wherein said first die member is stationary and wherein said means for moving said second die member produces oscillatory rotary movement of said second die member.

5. The apparatus of claim 4 wherein said oscillatory movement is through a distance at least as great as the open portion of said extrusion opening of said first die member to enable extrudates from said filament extrusion orifices to traverse said open portion.

6. The apparatus of claim 1 wherein said first die member and said second die member define a miter line therebetween, and wherein said extrusion opening in said first die member and said filament extrusion orifices in said second die member are spaced from said miter line.

7. The apparatus of claim 1 wherein said extrusion opening in said first die member defines a section of a circle having an open segment and enclosing an angle greater than 180°.

8. The apparatus of claim 1 wherein said extrusion opening in said first die member defines a U-shaped product and including second filament extrusion orifices in said first die member disposed in the open gap between the ends of said U-shaped figure.

* * * * *